(12) United States Patent
Cho et al.

(10) Patent No.: US 8,605,790 B2
(45) Date of Patent: Dec. 10, 2013

(54) FRAME INTERPOLATION APPARATUS AND METHOD FOR MOTION ESTIMATION THROUGH SEPARATION INTO STATIC OBJECT AND MOVING OBJECT

(75) Inventors: Hwa-hyun Cho, Seoul (KR); Jong-seon Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 1225 days.

(21) Appl. No.: 12/020,741

(22) Filed: Jan. 28, 2008

(65) Prior Publication Data

US 2008/0187050 A1 Aug. 7, 2008

(30) Foreign Application Priority Data

Feb. 2, 2007 (KR) .................. 10-2007-0011259

(51) Int. Cl.
*H04N 7/26* (2006.01)
*H04N 11/04* (2006.01)
*H04N 11/02* (2006.01)
*H04B 1/66* (2006.01)

(52) U.S. Cl.
USPC .................................................. 375/240.17

(58) Field of Classification Search
None
See application file for complete search history.

(56) References Cited

U.S. PATENT DOCUMENTS

| | | | |
|---|---|---|---|
| 6,335,985 B1 * | 1/2002 | Sambonsugi et al. | 382/190 |
| 7,010,039 B2 * | 3/2006 | De Haan et al. | 375/240.16 |
| 7,480,334 B2 * | 1/2009 | Nair | 375/240.16 |
| 2004/0013197 A1 * | 1/2004 | Park | 375/240.11 |
| 2005/0002455 A1 * | 1/2005 | Lin et al. | 375/240.16 |
| 2006/0215761 A1 * | 9/2006 | Shi et al. | 375/240.16 |
| 2007/0140347 A1 * | 6/2007 | Moon et al. | 375/240.16 |

FOREIGN PATENT DOCUMENTS

| | | |
|---|---|---|
| EP | 0 833 515 A2 | 4/1998 |
| JP | 2002-032760 A | 1/2002 |
| KR | 1020000039731 A | 7/2000 |
| KR | 1020020028625 A | 4/2002 |
| KR | 1020040046891 A | 6/2004 |

* cited by examiner

*Primary Examiner* — Gregory Sefcheck
*Assistant Examiner* — Steve Young
(74) *Attorney, Agent, or Firm* — Myers Bigel Sibley & Sajovec

(57) ABSTRACT

Provided are frame interpolation apparatus and methods in which motion estimation is performed by separation into a static object and a moving object. The frame interpolation apparatus interpolates multiple frames including an $n^{th}$ frame and an $(n-1)^{th}$ frame located adjacent the $n^{th}$ frame in order to generate an interpolation frame. Some embodiments of the apparatus include a static object separation unit, a motion vector (MV) estimation unit, and an interpolation frame generation unit. The static object separation unit may compare a macroblock (MB) of the $n^{th}$ frame with an MB of the $(n-1)^{th}$ frame, which may correspond to the MB of the $n^{th}$ frame, in order to separate each MB of the $n^{th}$ frame into a static object and a moving object. The MV estimation unit may search in the $(n-1)^{th}$ frame for an MB that matches with each of MBs of the $n^{th}$ frame, which may be determined to be the moving object, to estimate an MV. The interpolation frame generation unit may generate the interpolation frame using the estimated MV, the $n^{th}$ frame, and the $(n-1)^{th}$ frame.

19 Claims, 9 Drawing Sheets

(N−1)$^{TH}$ FRAME   N$^{TH}$ FRAME (A) MOTION VECTOR (MV)  (B) MV CLASS (C) INTERPOLATION FRAME

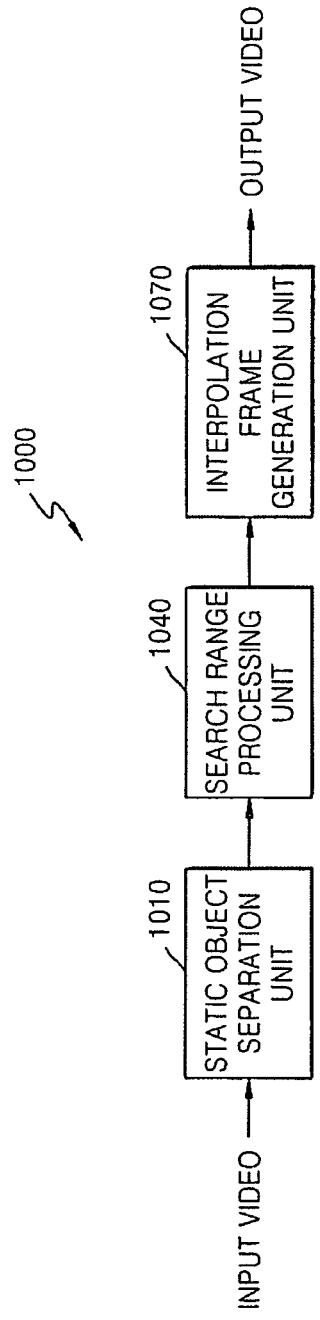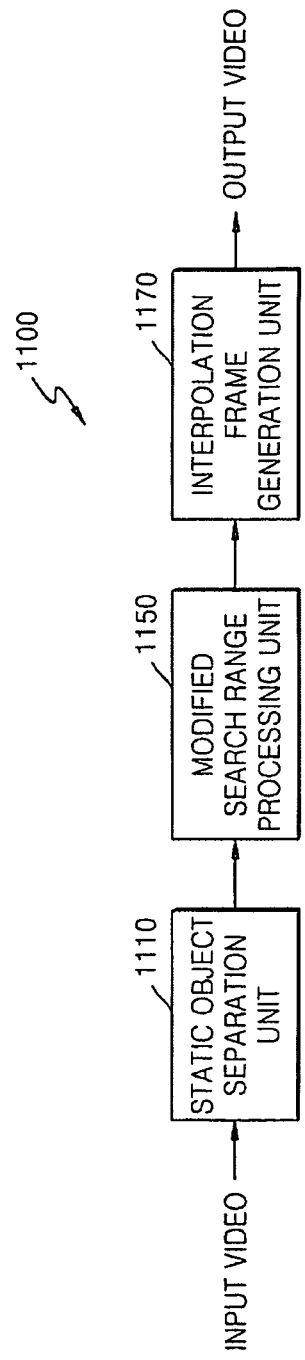

FRAME INTERPOLATION APPARATUS AND METHOD FOR MOTION ESTIMATION THROUGH SEPARATION INTO STATIC OBJECT AND MOVING OBJECT

CROSS-REFERENCE TO RELATED PATENT APPLICATION

This application claims the benefit of Korean Patent Application No. 10-2007-0011259, filed on Feb. 2, 2007, in the Korean Intellectual Property Office, the disclosure of which is incorporated herein in its entirety by reference.

BACKGROUND OF THE INVENTION

The present invention generally relates to electronic display control, and more particularly, to a frame rate conversion apparatus and method in which frames are converted.

Conventionally, in personal computers (PC) or high-definition televisions (HDTV), frame rate conversion may be performed for compatibility between programs having various broadcasting signal standards such as PAL or NTSC. Frame rate conversion may mean conversion of the number of frames that are output per second. In particular, when a frame rate is increased, interpolation of a new frame may be required. The interpolated frame may be referred to as an interpolation frame. To generate the interpolation frame, motion estimation (ME) may be used. ME may include searching for the most similar blocks between a previous frame and a current frame. A motion vector (MV) may indicate a magnitude of block's movement in ME.

A conventional ME method may be used to reduce temporal redundancy of video data and to generate the MV. Among various ME methods for generating the MV, a block matching algorithm (BMA) may be used. The BMA may search for movement in each block and apply a motion vector corresponding to the movement to all pixels included in the block. The BMA may require a small amount of time to be executed and can be easily implemented as hardware. In a general video, motions can be classified into rotation, translation, and zoom-in/out. In this regard, it may be assumed that a motion between frames having a very small interval therebetween is very little. Therefore, the BMA may be performed on the assumption that there is only translation in a video and motions of all pixels in the same block are the same. Thus, the BMA may search for a block that is most similar to a current block of a current frame in a search range of a previous frame and determine a displacement between the two blocks as an MV. This process may be called a full search. Each block may be composed of 16×16 pixels and may be called as a macroblock (MB).

Since the full search may perform comparison with all pixels included in the search range, it can find an MV having the smallest matching error. However, the full search may require significant computation resources. In other words, the conventional BMA may result in unnecessary computation and power consumption because it may perform ME even for a portion having no motion. Moreover, the conventional BMA may perform a wrong ME by not distinguishing between a static object and a moving object. In this regard, degradation in display quality may result when the wrong ME is applied to an interpolated image.

SUMMARY

Some embodiments of the present invention provide a frame interpolation apparatus capable of generating an accurate interpolation frame through low-power driving and an accurate true motion vector by separation into a static object and a moving object, performing motion estimation only on the moving object, and performing motion estimation in a modified search range. Some embodiments of a frame interpolation apparatus that interpolates multiple frames including an $n^{th}$ frame and an $(n-1)^{th}$ frame located adjacent to the $n^{th}$ frame to generate an interpolation frame may include a static object separation unit that is configured to compare an $n^{th}$ frame macroblock (MB) of multiple $n^{th}$ frame MBs with an $(n-1)^{th}$ frame MB of multiple $(n-1)^{th}$ frame MBs to separate the $n^{th}$ frame MB into a static object and a moving object and a motion vector (MV) estimation unit that is configured to search the $(n-1)^{th}$ frame for an MB that matches the $n^{th}$ frame MB that is determined to be the moving object to estimate an MV. Some embodiments may include an interpolation frame generation unit that is configured to generate the interpolation frame using the estimated MV, the $n^{th}$ frame, and the $(n-1)^{th}$ frame.

In some embodiments, the MV estimation unit includes a search range processing unit that is configured to search in a first search range of the $(n-1)^{th}$ frame for the MB that matches with the $n^{th}$ frame MB to estimate a first MV, a modified search range processing unit that is configured to search in a second search range of the $(n-1)^{th}$ frame for the MB that matches with the $n^{th}$ frame MB to estimate a second MV, and a current MB processing unit that is configured to match $n^{th}$ frame MB with an $(n-1)^{th}$ frame MB of the plurality of $(n-1)^{th}$ frame MBs, which corresponds to the $n^{th}$ frame MB to estimate a third MV. In some embodiments, the first search range includes MBs of the $(n-1)^{th}$ frame and the second search range includes the $(n-1)^{th}$ frame MBs that correspond to $n^{th}$ frame MBs that are determined to be the moving object.

In some embodiments, the first search range includes the $(n-1)^{th}$ frame MB that corresponds to the matching $n^{th}$ frame MB and the $(n-1)^{th}$ frame MBs that are adjacent the corresponding $(n-1)^{th}$ frame MB. In some embodiments, the second search range includes the $(n-1)^{th}$ frame MB that corresponds to the matching $n^{th}$ frame MB and $(n-1)^{th}$ frame MBs that adjacent the corresponding $(n-1)^{th}$ frame MB and that corresponds to the $n^{th}$ frame MBs determined to be moving objects.

In some embodiments, the search range processing unit is configured to calculate a sum of absolute differences (SAD) for matching MBs and to estimate the first MV between an $(n-1)^{th}$ frame MB that has a minimum SAD and the $n^{th}$ frame MB. Some embodiments provide that the modified search range processing unit is configured to calculate a sum of absolute differences (SAD) for matching MBs and to estimate the second MV between an $(n-1)^{th}$ frame MB that has a minimum SAD, and the $n^{th}$ frame MB. In some embodiments, the current MB processing unit is configured to calculate a sum of absolute differences (SAD) for matching MBs to estimate the third MV.

Some embodiments provide that the interpolation frame generation unit is configured to generate the interpolation frame using a median value of the estimated first MV, the estimated second MV, and the estimated third MV. In some embodiments, the interpolation frame generation unit is configured to generate the interpolation frame using a median value of the $n^{th}$ frame MB and the $(n-1)^{th}$ frame MB when a matching MB that matches with the $n^{th}$ frame MB of exists in the $(n-1)^{th}$ frame.

In some embodiments, the interpolation frame generation unit is configured to generate the interpolation frame using the $n^{th}$ frame MB or the $(n-1)^{th}$ frame MB according to a direction of the estimated MV when a matching MB that matches with the $n^{th}$ frame MB does not exist in the $(n-1)^{th}$ frame. In some embodiments, the interpolation frame generation unit uses the $n^{th}$ frame MB when a direction of the estimated MV is from left to right and uses the $(n-1)^{th}$ frame MB when a direction of the estimated MV is from right to left. In some embodiments, the static object separation unit is configured to calculate a difference between luminance signals of the $n^{th}$ frame MB and a corresponding $(n-1)^{th}$ frame MB, compare the difference with a threshold that is a criterion for distinguishing the moving object from the static object, and separate each of the plurality of $n^{th}$ frame MBs into the static object and the moving object.

In some embodiments, the static object separation unit is configured to determine the $n^{th}$ frame MB as the moving object when the difference is greater than the threshold and to determine the $n^{th}$ frame MB as the static object when the difference is less than the threshold. In some embodiments, the MV estimation unit is configured to search in a search range of the $(n-1)^{th}$ frame for an MB that matches with an MB of the $n^{th}$ frame to estimate the MV, wherein the search range includes an $(n-1)^{th}$ frame MB that corresponds to the $n^{th}$ frame MB and the $(n-1)^{th}$ frame MBs that are adjacent the $(n-1)^{th}$ frame MB that corresponds to the $n^{th}$ frame MB.

Some embodiments of the present invention include a frame interpolation apparatus that interpolates multiple frames including an nth frame and an $(n-1)^{th}$ frame located adjacent the $n^{th}$ frame in order to generate an interpolation frame. Some embodiments of such an apparatus include a static object separation unit that is configured to compare an $n^{th}$ frame macroblock (MB) with an $(n-1)^{th}$ frame MB that corresponds to the $n^{th}$ frame MB to separate each of multiple $n^{th}$ frame MBs into a static object and a moving object and a motion vector (MV) estimation unit that is configured to search in a search range of the $(n-1)^{th}$ frame for an MB that matches each of the $n^{th}$ frame MBs that are determined to be the moving object to estimate an MV. Some embodiments include an interpolation frame generation unit that is configured to generate the interpolation frame using the estimated MV, the $n^{th}$ frame, and the $(n-1)^{th}$ frame, such that the search range includes the $(n-1)^{th}$ frame MBs that correspond to each of the $n^{th}$ frame MBs that are determined to be the moving object.

In some embodiments, the search range includes the $(n-1)^{th}$ frame MB that corresponds to a matching $n^{th}$ frame MB and the $(n-1)^{th}$ frame MB's that are located adjacent a corresponding $(n-1)^{th}$ frame MB and that correspond to the $n^{th}$ frame MBs that are determined to be the moving object. Some embodiments provide that the interpolation frame generation unit is configured to generate the interpolation frame using a median value of the $n^{th}$ frame MB and the $(n-1)^{th}$ frame MB when an MB that matches the $n^{th}$ frame MB exists in the $(n-1)^{th}$ frame.

In some embodiments, the interpolation frame generation unit is configured to generate the interpolation frame using the $n^{th}$ frame MB or the $(n-1)^{th}$ frame MB according to a direction of the estimated MV when an $(n-1)^{th}$ frame MB that matches with the $n^{th}$ frame MB does not exist in the $(n-1)^{th}$ frame.

In some embodiments, the static object separation unit is configured to calculate a difference between luminance signals of the $n^{th}$ frame MB and a corresponding $(n-1)^{th}$ frame MB, to compare the difference with a threshold that is a criterion for distinguishing the moving object from the static object, and to separate each $n^{th}$ frame MB into the static object and the moving object.

Some embodiments of the present invention include interpolation methods that interpolate multiple frames including an $n^{th}$ frame and an $(n-1)^{th}$ frame that is located adjacent the $n^{th}$ frame to generate an interpolation frame. Some embodiments of such methods include comparing an $n^{th}$ frame macroblock (MB) with an $(n-1)^{th}$ frame MB that corresponds to the $n^{th}$ frame MB to separate each of multiple $n^{th}$ frame MBs into a static object and a moving object and searching in the $(n-1)^{th}$ frame for an MB that matches each of the $n^{th}$ frame MBs that are determined to be the moving object. Some embodiments include estimating a motion vector (MV) responsive to the MB that matches each of the plurality of $n^{th}$ frame MBs that are determined to be the moving object and generating the interpolation frame using an estimated MV, the $n^{th}$ frame, and the $(n-1)^{th}$ frame.

In some embodiments, estimating the MV includes searching in a first search range of the $(n-1)^{th}$ frame for an MB that matches each of the $n^{th}$ frame MBs to estimate a first MV, searching in a second search range of the $(n-1)^{th}$ frame for an MB that matches each of the $n^{th}$ frame MBs to estimate a second MV, and matching an nil frame MB with an $(n-1)^{th}$ frame MB that corresponds to the $n^{th}$ frame MB to estimate a third MV. In some embodiments, the first search range includes the $(n-1)^{th}$ frame MBs and the second search range includes the $(n-1)^{th}$ frame MBs that correspond to the $n^{th}$ frame MBs that are determined to be the moving object.

In some embodiments, the first search range includes the $(n-1)^{th}$ frame MB that corresponds to the matching $n^{th}$ frame MB and the $(n-1)^{th}$ frame MBs that are located adjacent to the corresponding $(n-1)^{th}$ frame MB. In some embodiments, the second search range includes the $(n-1)^{th}$ frame MB that corresponds to a matching $n^{th}$ frame MB and the $(n-1)^{th}$ frame MBs that are adjacent the corresponding $(n-1)^{th}$ frame MB and correspond to the $n^{th}$ frame MBs that are determined to be the moving object.

In some embodiments, estimation of the first MV includes calculating a sum of absolute differences (SAD) for matching MBs and estimating the first MV between an $(n-1)^{th}$ frame MB that has a minimum SAD and the $n^{th}$ frame MB. In some embodiments, estimation of the second MV includes calculating a sum of absolute differences (SAD) for matching MBs and estimating the second MV between an $(n-1)^{th}$ frame MB that has the minimum SAD and the $n^{th}$ frame MB. In some embodiments, estimation of the third MV includes calculating a sum of absolute differences (SAD) for matching MBs to estimate the third MV.

In some embodiments, generating the interpolation frame includes selecting a median value of the estimated first MV, the estimated second MV, and the estimated third MV and generating the interpolation frame using the selected median value.

In some embodiments, generating the interpolation frame includes determining whether an MB that matches the $n^{th}$ frame MB exists in the $(n-1)^{th}$ frame, generating the interpolation frame using a median value of the $n^{th}$ frame MB and the $(n-1)^{th}$ frame MB when an MB that matches the $n^{th}$ frame MB exists in the $(n-1)^{th}$ frame and generating the interpolation frame using the $n^{th}$ frame MB or the $(n-1)^{th}$ frame MB according to a direction of the estimated MV when an MB that matches the $n^{th}$ frame MB does not exist in the $(n-1)^{th}$ frame.

In some embodiments, generating the interpolation frame according to the direction of the estimated MV includes determining the direction of the estimated MV, generating the interpolation frame using the $n^{th}$ frame MB when the direction of the estimated MV is from left to right and generating the interpolation frame using the $(n-1)^{th}$ frame MB when the direction of the estimated MV is from right to left.

In some embodiments, comparing an $n^{th}$ frame macroblock (MB) with an $(n-1)^{th}$ frame MB that corresponds to the $n^{th}$ frame MB to separate each of multiple $n^{th}$ frame MBs into a static object and a moving object includes calculating a difference between luminance signals of the $n^{th}$ frame MB and the corresponding $(n-1)^{th}$ frame MB and comparing the difference with a threshold that is a criterion for distinguishing the moving object from the static object. Some embodiments include separating each of the $n^{th}$ frame MBs into the static object and the moving object.

In some embodiments, separating each of the $n^{th}$ frame MBs includes determining the $n^{th}$ frame MB as the moving object when the difference is greater than the threshold and determining the $n^{th}$ frame MB as the static object when the difference is less than the threshold.

In some embodiments, estimation of the MV includes searching in a search range of the $(n-1)^{th}$ frame for an MB that matches an $n^{th}$ frame MB to estimate the MV, wherein the search range includes an $(n-1)^{th}$ frame MB that corresponds to a matching $n^{th}$ frame MB and $(n-1)^{th}$ frame MBs that are adjacent a corresponding $(n-1)^{th}$ frame MB.

Some embodiments of the present invention include frame interpolation methods that interpolates multiple frames including an $n^{th}$ frame and an $(n-1)^{th}$ frame that is located adjacent the $n^{th}$ frame to generate an interpolation frame. Methods of some embodiments include comparing an $n^{th}$ frame macroblock (MB) in the $n^{th}$ frame with an $(n-1)^{th}$ frame MB in the $(n-1)^{th}$ frame that corresponds to the $n^{th}$ frame MB to separate each of multiple $n^{th}$ frame MBs into a static object and a moving object. Some embodiments may include searching in a search range of the $(n-1)^{th}$ frame for an MB that matches with each of the $n^{th}$ frame MBs that are determined to be the moving object to estimate a motion vector (MV) and generating the interpolation frame using an estimated MV, the $n^{th}$ frame, and the $(n-1)^{th}$ frame. In some embodiments, the search range includes the $(n-1)^{th}$ frame MBs that correspond to the $n^{th}$ frame MBs that are determined to be the moving object.

In some embodiments, the search range includes the $(n-1)^{th}$ frame MB that corresponds to a matching $n^{th}$ frame MB and multiple $(n-1)^{th}$ frame MBs that are adjacent a corresponding $(n-1)^{th}$ frame MB and that correspond to the $n^{th}$ frame MBs that are determined to be the moving object.

In some embodiments, generating the interpolation frame includes determining whether an MB that matches the $n^{th}$ frame MB exists in the $(n-1)^{th}$ frame, generating the interpolation frame using a median value of the $n^{th}$ frame MB and the $(n-1)^{th}$ frame MB when the MB that matches the $n^{th}$ frame MB exists in the $(n-1)^{th}$ frame, and generating the interpolation frame using the $n^{th}$ frame MB or the $(n-1)^{th}$ frame MB according to a direction of the estimated MV when the MB that matches the $n^{th}$ frame MB does not exist in the $(n-1)^{th}$ frame.

In some embodiments, generating the interpolation frame according to a direction of the estimated MV includes determining the direction of the estimated MV, generating the interpolation frame using the $n^{th}$ frame MB when the direction of the estimated MV is from left to right, and generating the interpolation frame using the $(n-1)^{th}$ frame MB when the direction of the estimated MV is from right to left. In some embodiments, comparing an $n^{th}$ frame macroblock (MB) in the $n^{th}$ frame with an $(n-1)^{th}$ frame MB in the $(n-1)^{th}$ frame that corresponds to the $n^{th}$ frame MB to separate each of a plurality of $n^{th}$ frame MBs into a static object and a moving object includes calculating a difference between luminance signals of the $n^{th}$ frame MB and a corresponding $(n-1)^{th}$ frame MB, comparing the difference with a threshold that is a criterion for distinguishing the moving object from the static object, and separating each of the $n^{th}$ frame MBs into the static object and the moving object.

BRIEF DESCRIPTION OF THE DRAWINGS

The accompanying figures are included to provide a further understanding of the present invention, and are incorporated in and constitute a part of this specification. The drawings illustrate exemplary embodiments of the present invention and, together with the description, serve to explain principles of the present invention.

FIG. 10 is a block diagram illustrating a frame interpolation apparatus according to some embodiments of the present invention.

FIG. 11 is a block diagram illustrating a frame interpolation apparatus according to some embodiments of the present invention.

DETAILED DESCRIPTION OF THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

Figure 1:
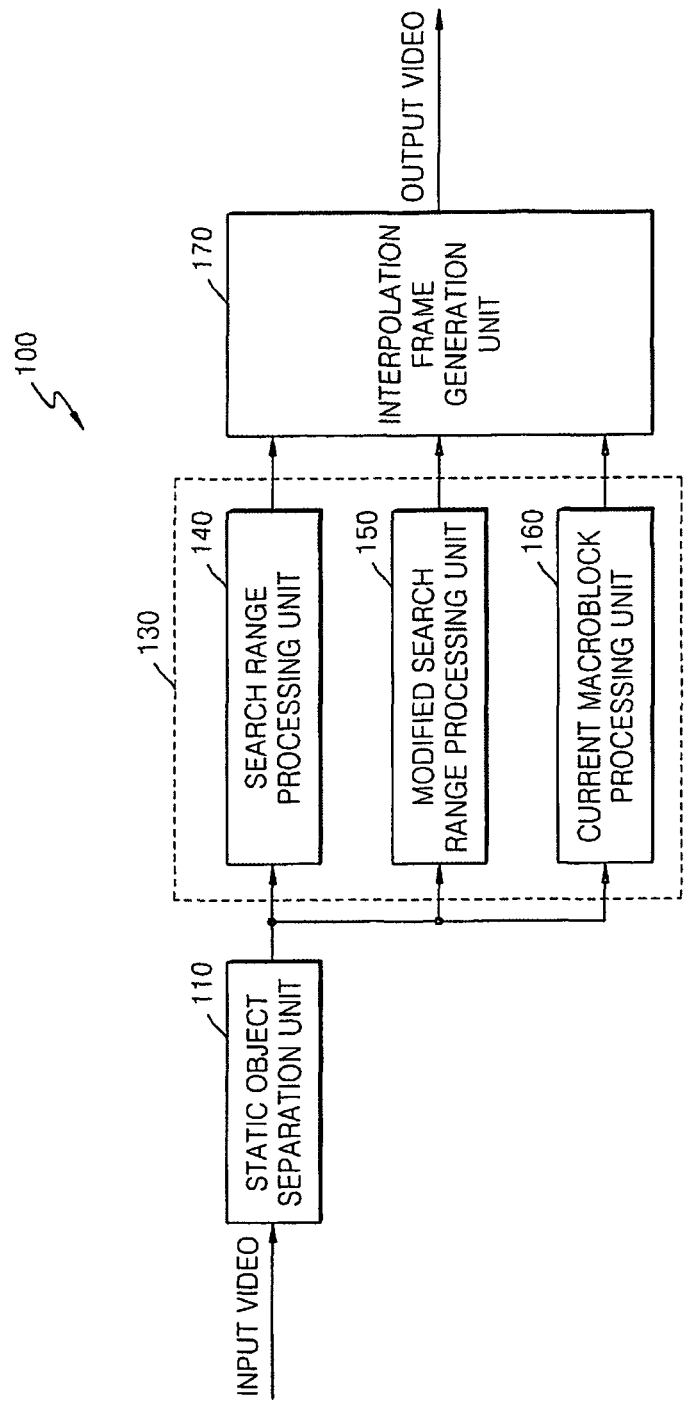
FIG. 1 is a block diagram of a frame interpolation apparatus according to some embodiments of the present invention.

Reference is now made to FIG. 1, which is a block diagram of a frame interpolation apparatus 100 according to some embodiments of the present invention. The frame interpolation apparatus 100 may include a static object separation unit 110, a motion vector (MV) estimation unit 130, and an interpolation frame generation unit 170. The frame interpolation apparatus 100 may generate an interpolation frame by interpolating an $n^{th}$ frame and an $(n-1)^{th}$ frame, in which n is an integer greater than 2. The $n^{th}$ frame may be a current frame and the $(n-1)^{th}$ frame may be a previous frame that immediately precedes the current frame. The static object separation unit 110 may separate the $n^{th}$ frame into a static object and a moving object in units of a macroblock (MB). In other words, the frame interpolation apparatus 100 may compare each MB of the $n^{th}$ frame with a corresponding MB of the $(n-1)^{th}$ frame and separate each MB of the $n^{th}$ frame into a static object and a moving object.

The MV estimation unit 130 may search in the $(n-1)^{th}$ frame for an MB that matches with each of MBs of the $n^{th}$ frame, which may be determined to be the moving object. In this manner, an MV may be estimated. The MV estimation unit 130 may include a search range processing unit 140, a modified search range processing unit 150 and a current MB processing unit 160. The search range processing unit 140 may search in a first search range of the $(n-1)^{th}$ frame for an MB that matches with each of the MBs of the $n^{th}$ frame. In this manner, a first MV may be estimated. The first search range may include the matching MB of the $(n-1)^{th}$ frame and MBs of the $(n-1)^{th}$ frame, which may be located adjacent the matching MB of the $(n-1)^{th}$ frame. In other words, the search range processing unit 140 may estimate an MV using a full search. The modified search range processing unit 150 may search in a second search range of the $(n-1)^{th}$ frame for an MB that matches with each of the MBs of the $n^{th}$ frame. Thus, a second MV may be estimated. The second search range may include MBs of the $(n-1)^{th}$ frame, which may correspond to the MBs of the $n^{th}$ frame determined to be the moving object. The current MB processing unit 160 may match an MB of the $n^{th}$ frame with an MB of the $(n-1)^{th}$ frame corresponding to the MB of the $n^{th}$ frame. Thus, a third MV may be estimated. The static object separation unit 110, the search range processing unit 140, the modified search range processing unit 150, and the current MB processing unit 160 will be described later in more detail with reference to FIGS. 3 through 6.

The interpolation frame generation unit 170 may generate the interpolation frame using an estimated MV, the $n^{th}$ frame, and the $(n-1)^{th}$ frame. The interpolation frame generation unit 170 may generate the interpolation frame using a median value of the estimated first MV, the estimated second MV, and/or the estimated third MV. The interpolation frame generation unit 170 may use different frame interpolation methods according to whether an MB of the $(n-1)^{th}$ frame, which matches with an MB of the $n^{th}$ frame, distinctly exists. In this manner, an occlusion region may be processed. The operation of the interpolation frame generation unit 170 will be described later in more detail with reference to FIGS. 7 through 9.

Figure 2:
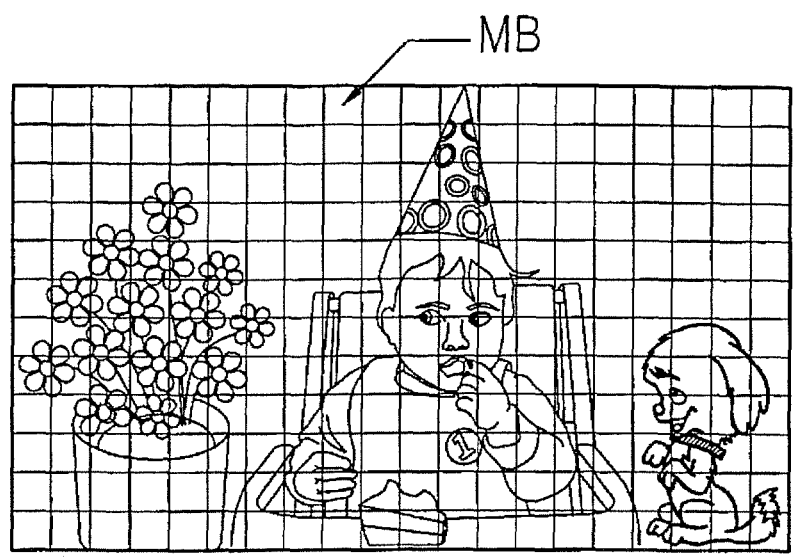
FIG. 2 illustrates a frame that is divided into macroblocks according to some embodiments of the present invention.

Reference is now made to FIG. 2, which illustrates a frame that is divided into MBs according to some embodiments of the present invention. A single frame may be divided into a plurality of MBs, each of which may be composed of, for example, 16×16 pixels. In some embodiments, each of the MBs may also be composed of a variety of quantities and/or configurations of pixels.

Figure 3:
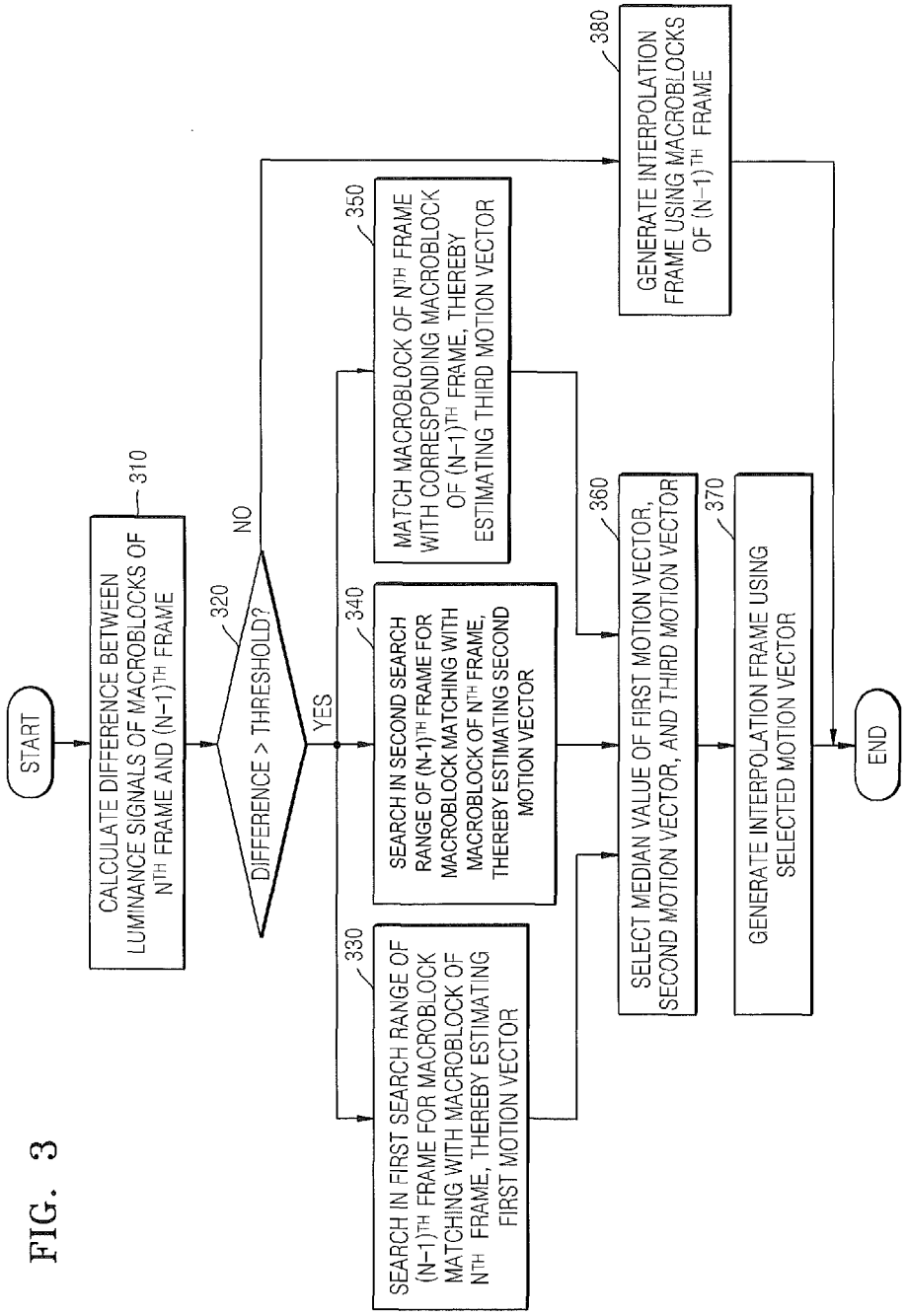
FIG. 3 is a flowchart of frame interpolation methods according to some embodiments of the present invention.
Figures 4, 5:
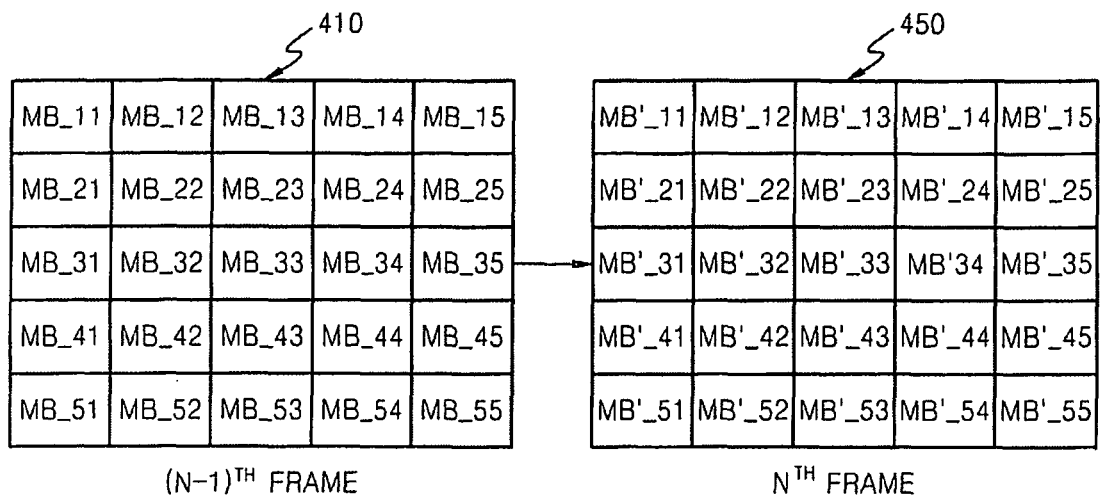
FIGS. 4 and 5 illustrate frames divided into macroblocks according to an operation of a static object separation unit illustrated in FIG. 1.

Reference is now made to: FIG. 3, which is a flowchart of frame interpolation methods according to some embodiments of the present invention; FIGS. 4 and 5, which illustrate frames 410 and 450 divided into macroblocks in operations of the static object separation unit 110 illustrated in FIG. 1; and FIGS. 6A through 6C, which illustrate frames 410 and 450 divided into macroblocks in operations of the motion vector estimation unit 130 illustrated in FIG. 1. Referring to FIGS. 1 and 3 through 6C, the static object separation unit 110 may calculate a difference between luminance values of an MB of the $n^{th}$ frame and an MB of the $(n-1)^{th}$ frame (block 310). The difference $\text{Img}_{Diff}$ can be calculated as follows:

$$\text{Img}_{Diff} = |f(x,y,n-1) - f(x,y,n)| \quad (1),$$

where f( ) indicates a luminance value of a frame, x and y indicate the spatial position of the frame, and n and (n−1) indicate frame numbers.

As illustrated in FIG. 4, when an $n^{th}$ frame 450 is divided into 5×5 MBs MB'_11, MB'_12, . . . , MB'_55 and an $(n-1)^{th}$ frame 410 is divided into 5×5 MBs MB_11, MB_12, . . . , MB_55, the difference $\text{Img}_{Diff}$ for an MB of the $n^{th}$ frame 450 and an MB of the $(n-1)^{th}$ frame 450 corresponding thereto is calculated. In other words, a difference between a luminance value of the MB MB'_11 of the $n^{th}$ frame 450 and a luminance value of the MB MB_11 of the $(n-1)^{th}$ frame 410 may be calculated and a difference between a luminance value of the MB MB'_12 of the $n^{th}$ frame 450 and a luminance value of the MB MB_12 of the $(n-1)^{th}$ frame 410 may be calculated. In this manner, the differences $\text{Img}_{Diff}$ for the other MBs may be calculated.

In some embodiments, the static object separation unit 110 may compare the difference with a threshold that is a criterion for distinguishing a moving object from a static object (block 320). The difference may be large for a moving object, while the difference may be small for a static object. Thus, the static object separation unit 110 may compare the difference with the threshold in order to determine that a corresponding MB is a moving object if the difference is greater than the threshold and that the MB is a static object if the difference is less than the threshold. Once separation into a moving object and/or a static object for each MB of the $n^{th}$ frame 450 is finished, "1" is allocated to an MB determined to be a moving object and "0" is allocated to an MB determined to be a static object as illustrated in FIG. 5. In this manner, a binarized image may be implemented. In the following description, motion estimation (ME) may be performed only on MBs allocated "1". Since MBs allocated "0" are determined to be static objects, an interpolation frame may generated using corresponding MBs of (n−1)$^{th}$ frame without ME for the MBs allocated "0".

The search range processing unit 140, the modified search range processing unit 150, and the current MB processing unit 160 may estimate the first MV, the second MV, and the third MV for the MBs that are determined to be a moving object.

Figure 6A:
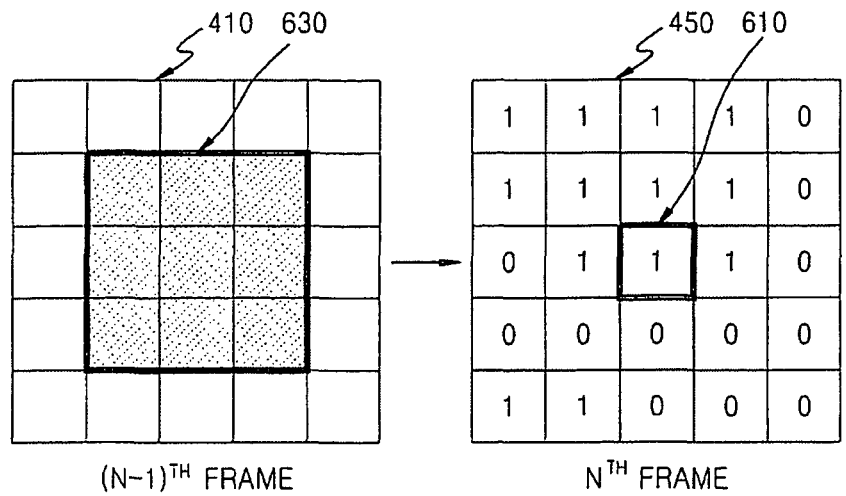
FIGS. 6A through 6C illustrate frames divided into macroblocks according to an operation of a motion vector estimation unit illustrated in FIG. 1.

Hereinafter, the operations of the search range processing unit 140 according to some embodiments will be described with reference to FIG. 6A. In order to process an MB 610 of the n$^{th}$ frame 450, the search range processing unit 140 may search for an MB that matches with the MB 610 of the n$^{th}$ frame in a first search range 630 of the (n−1)$^{th}$ frame 410. In this manner, the first MV may be estimated (block 330). The first search range 630 may include an MB MB_33 of the (n−1)$^{th}$ frame 410 corresponding to the MB 610 of the n$^{th}$ frame 450 and MBs MB_22, MB_23, MB_24, MB_32, MB_34, MB_42, MB_43, and MB_44 of the (n−1)$^{th}$ frame 410, which are located adjacent to the MB MB_33. Although, as illustrated, the MBs included the first search range have a size of 3×3, in some embodiments they may also have a size of 4×4, 4×5 and/or 5×5, among others.

Figure 6B:
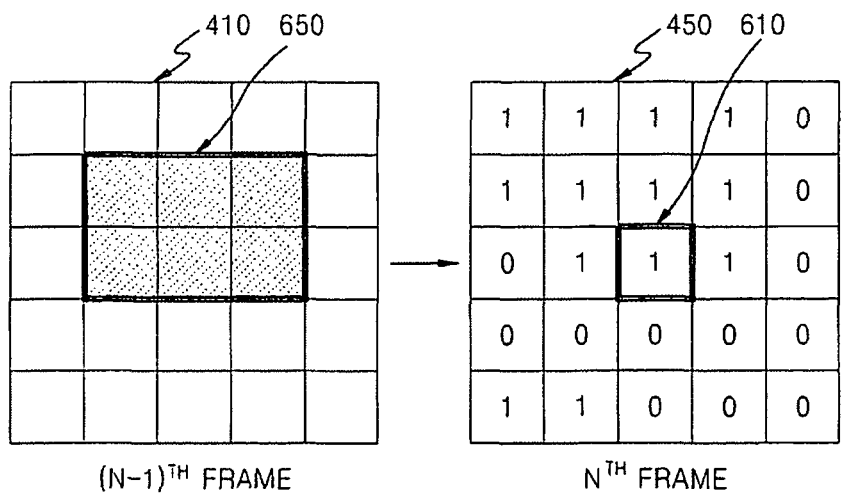

The operation of the modified search range processing unit 150 according to some embodiments will now be described with reference to FIG. 6B. In order to process the MB 610 of the n$^{th}$ frame 450, the modified search range processing unit 150 may search for an MB that matches with the MB 610 of the n$^{th}$ frame in a second search range 650 of the (n−1)$^{th}$ frame 410. In this manner, the second MV may be estimated (block 340). The second search range 650 may include the MB MB_33 of the (n−1)$^{th}$ frame 410 corresponding to the MB 610 of the n$^{th}$ frame 450. The second search range 650 may include MBs MB_22, MB_23, MB_24, MB_32, MB_33, and MB_34 of the (n−1)$^{th}$ frame 410, which are located adjacent to the MB MB_33 and correspond to MBs MB'_22, MB'_23, MB'_24, MB'_32, MB'_33, and MB'_34 of the n$^{th}$ frame 450, which are determined to be the moving object. In other words, only the MBs MB_22, MB_23, MB_24, MB_32, MB_33, and MB_34 of the (n−1)$^{th}$ frame 410, which correspond to the MBs MB'_22, MB'_23, MB'_24, MB'_32, MB'_33, and MB'_34 allocated "1" out of the MBs of the n$^{th}$ frame 450, may be defined as the second search range 650.

Figure 6C:
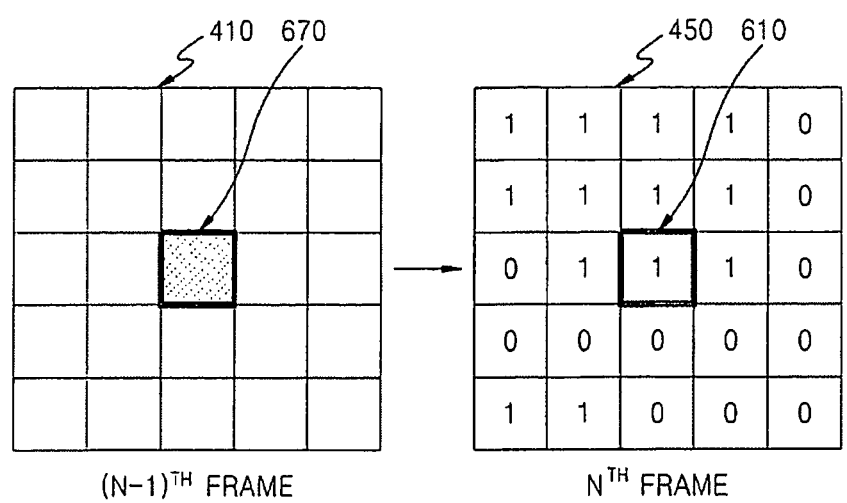

Operations of the current MB processing unit 160 according to some embodiments will now be described with reference to FIG. 6C. In order to process the MB 610 of the n$^{th}$ frame 450, the current MB processing unit 160 may match the MB 610 of the n$^{th}$ frame 450 with the MB MB'_33 of the (n−1)$^{th}$ frame 410 corresponding to the MB 610. In this manner, the third MV may be estimated (block 350).

For motion vector estimation with the search range processing unit 130, the modified search range processing unit 150, and the current MB processing unit 160, a mean square error (MSE) algorithm, a mean absolute difference (MAD) algorithm, and a sum of absolute difference (SAD) algorithm may be used. Motion vector estimation may be performed using the SAD algorithm, which is described herein. In some embodiments, motion vector estimation may be performed using the MAD algorithm among others within the scope and spirit of the present invention.

SADs between a current MB to be processed and all MBs included in the first search range or the second search range may be calculated using Equation 2. An MV may be determined by a spatial distance between the current MB and an MB having the minimum SAD as in Equation 3. In some embodiments, the SADs may be calculated as follows:

$$SAD(dx, dy) = \sum_{i=x}^{x+N-1} \sum_{j=y}^{y+N-1} |f_n(m, n) - f_{n-1}(i + dx, j + dy)|, \quad (2)$$

where N indicates the size of the MB, i and j indicate the spatial position of a current frame, n and (n−1) indicate frame numbers, and dx and dy indicate a difference between the positions of MBs of the current frame and a previous frame, i.e., an n$^{th}$ frame and an (n−1)$^{th}$ frame. Using the SADs, an MV for an MB having the minimum SAD may be obtained as follows:

$$(MV_x, MV_y) = \min_{(dx,dy) \in R^2} SAD(dx, dy), \quad (3)$$

where R indicates a search range for ME. In some embodiments, R may be the first search range, the second search range, and/or the MB MB_33.

The interpolation frame generation unit 170 may select a median value of the estimated first MV, the estimated second MV, and/or the estimated third MV (block 360) and generate the interpolation frame using the selected median value (block 370). In some embodiments, when any one of the estimated first, second or third MVs sharply changes, the interpolation frame generation unit 170 can recognize the MV as noise and remove the MV. Hereinafter, the operations for processing an occlusion region according to some embodiments of the interpolation frame generation unit 170 will be described.

Figure 7:
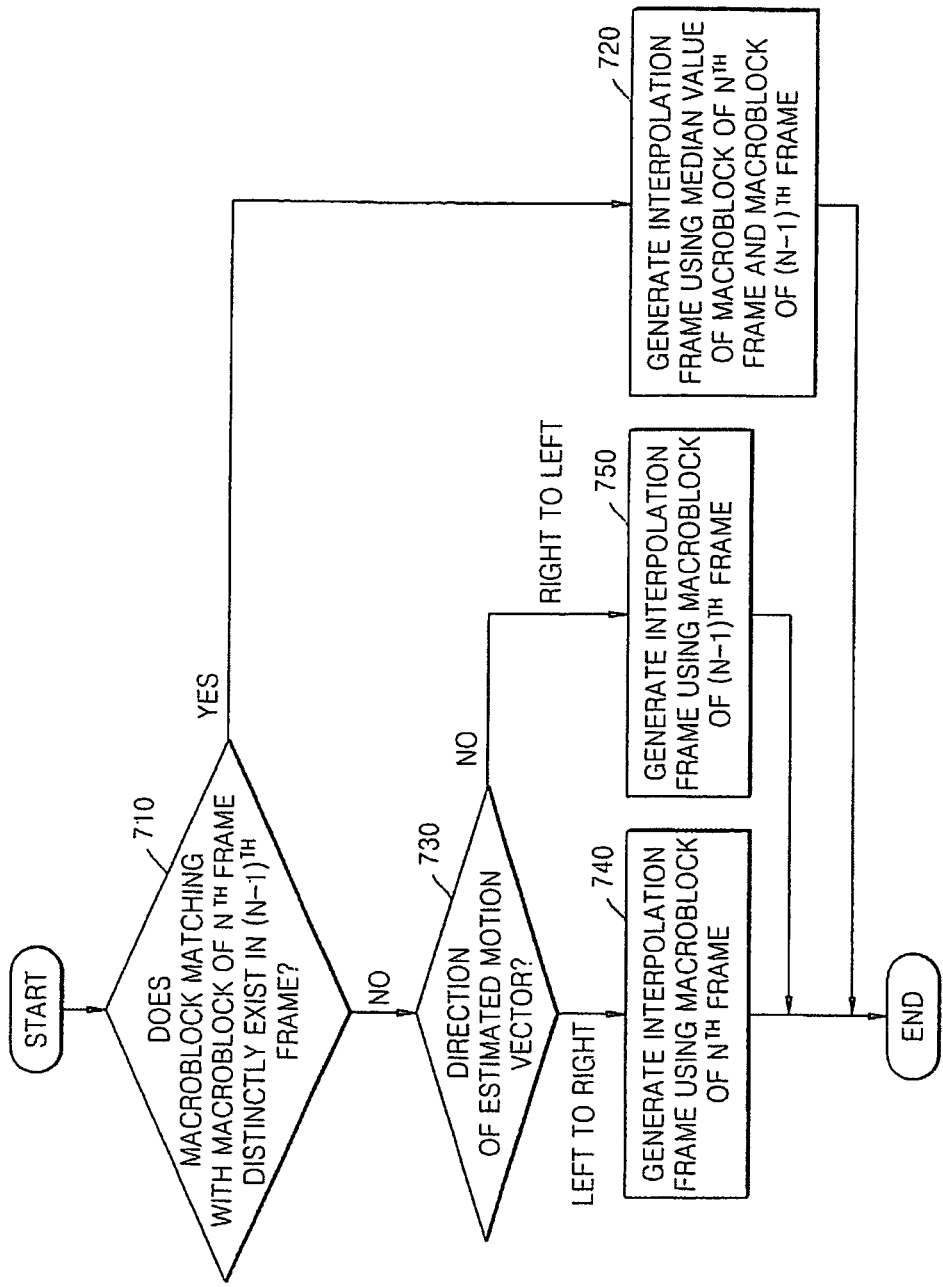
FIG. 7 is a flowchart of frame interpolation methods considering an occlusion region according to some embodiments of the present invention.
Figure 8:
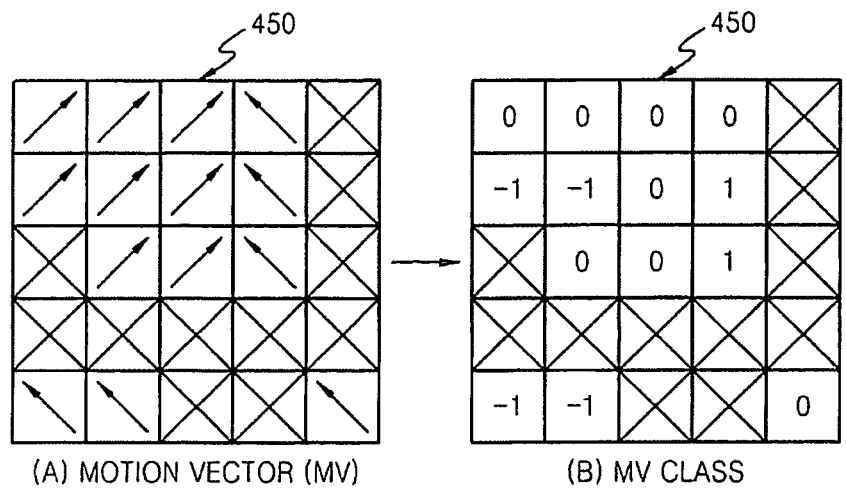
FIGS. 8A and 8B illustrate directions of motion vectors estimated for macroblocks according to some embodiments of the present invention.

Reference is now made to: FIG. 7, which is a flowchart of frame interpolation methods considering an occlusion region according to some embodiments of the present invention; and FIGS. 8A and 8B, which illustrate directions of MVs estimated for MBs according to some embodiments of the present invention. Also referring to FIGS. 1 and 4, the interpolation frame generation unit 170 may determine whether an MB that matches with an MB of the n$^{th}$ frame 450 distinctly exists in the (n−1)$^{th}$ frame 410 (block 710). In this regard, the interpolation frame generation unit 170 may determine whether the (n−1)$^{th}$ frame 410 includes an MB that accurately matches with an MB of the n$^{th}$ frame 450. When the MB of the (n−1)$^{th}$ frame 410 and the MB of the n$^{th}$ frame 450 accurately match with each other, the SAD may be equal to 0. In this case, the interpolation frame may be generated using a median value of the MB of the n$^{th}$ frame 450 and its matching MB of the (n−1)$^{th}$ frame 410 (block 720).

If the MB of the (n−1)$^{th}$ frame 410, which matches with the MB of the n$^{th}$ frame 450, does not distinctly exist, then the occlusion region exists. In this case, an image that does not exist in the (n−1)$^{th}$ frame 410 may exist in the n$^{th}$ frame 450 or an image that exists in the (n−1)$^{th}$ frame 410 may not exist in the n$^{th}$ frame 450. When the occlusion region exists, the direction of the estimated MV may be determined as illustrated in FIG. 5A (block 730). In FIG. 5A, MBs marked with X may be determined to be a static object. When estimated MVs have directions as illustrated in FIG. 8A, "0" may be allocated to an MB in which the SAD of an MV for the MB is equal to 0 as illustrated in FIG. 8B. When the SAD of an MV for an MB is not equal to 0 and the direction of the MV is from left to right, the MB may be allocated "−1". When the SAD of an MV for an MB is not equal to 0 and the direction of the MV is from right to left, the MB may be allocated "1". When "−1" is allocated to an MB of $n^{th}$ frame 450, the interpolation frame may be generated using the MB of the $n^{th}$ frame 450 (block 740). When "1" is allocated to the MB of $n^{th}$ frame 450, the interpolation frame may be generated using a corresponding MB of the $(n-1)^{th}$ frame 410 (block 750).

Figure 9:
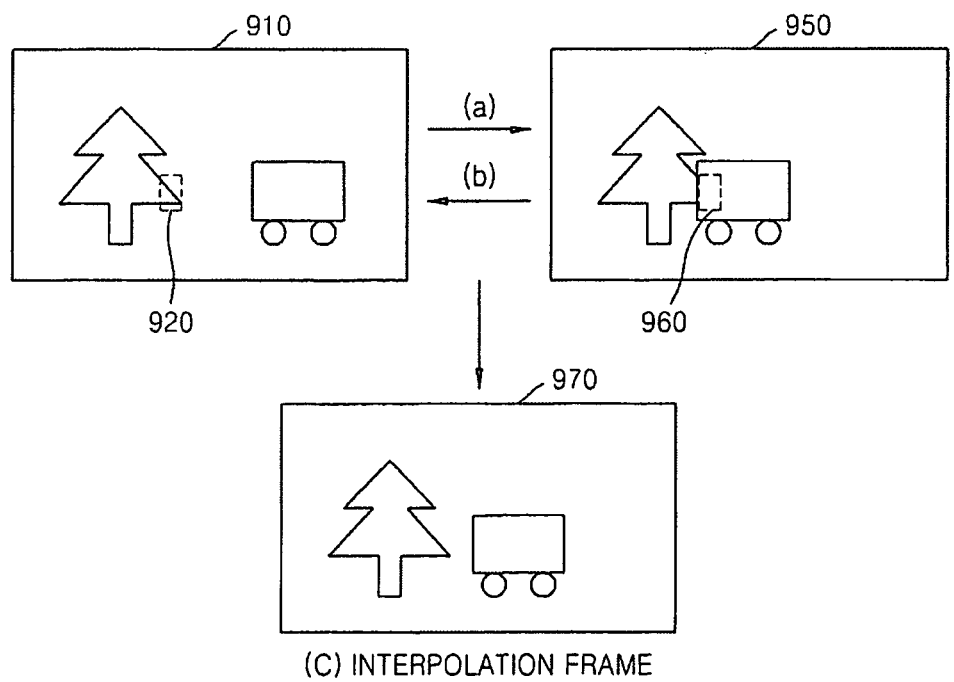
FIG. 9 illustrates generating an interpolation frame for an occlusion region according to some embodiments illustrated in FIG. 7.

Reference is now made to FIG. 9, which illustrates a process of generating an interpolation frame for an occlusion region according to some embodiments illustrated in FIG. 7. A stage (a) for generating an interpolation frame 970 between a previous frame 910 and a current frame 950 will be described first. A portion 920 that exists in the previous frame 910 disappears in the current frame 950 by being occluded by a car. In this case, since an MB corresponding to the portion 960 moves from right to left, it may be allocated "1" and the interpolation frame 970 may be generated using the portion 920 of the previous frame 910.

Next, a stage (b) for generating the interpolation frame 970 between the previous frame 950 and the current frame 910 will be described. The portion 920 that does not exist in the previous frame 950 exists in the current frame 910. Since the MB corresponding to the portion 960 moves from left to right, it may be allocated "−1" and the interpolation frame 970 may be generated using the portion 920 of the current frame 910.

Reference is now made to FIG. 10, which is a block diagram of a frame interpolation apparatus 1000 according to some embodiments of the present invention. A static object separation unit 101, a search range processing unit 1040, and an interpolation frame generation unit 1070 may operate in the same manner as the static object separation unit 110, the search range processing unit 140, and the interpolation frame generation unit 170 as discussed above regarding FIG. 1. The frame interpolation apparatus 1000 may obtain a first MV that is the same as that discussed above regarding FIG. 1 by the search range processing unit 1040 whereas the frame interpolation apparatus 100 illustrated in FIG. 1 may obtain three estimated MVs by the MV estimation unit 130. Other components of the frame interpolation apparatus 1000 may function according to those discussed above regarding FIG. 1 and thus will not be described again.

Reference is now made to FIG. 11, which is a block diagram of a frame interpolation apparatus 1100 according to some embodiments of the present invention. A static object separation unit 1110, a modified search range processing unit 1150, and an interpolation frame generation unit 1170 operate in a similar manner as those discussed above regarding FIG. 1. The frame interpolation apparatus 1100 may obtain a second MV that is the same as that discussed above regarding FIG. 1 by the modified search range processing unit 1150 whereas the frame interpolation apparatus 100 illustrated in FIG. 1 may obtain three estimated MVs by the MV estimation unit 130. Other components of the frame interpolation apparatus 1100 may function according to those discussed above regarding FIG. 1 and thus will not be described again.

As described herein, according to some embodiments of the present invention, an input video may be separated into a static object and a moving object according to the characteristics of the input video and motion estimation may be performed only on the moving object. In this manner, a display may be driven using less power. Moreover, by performing motion estimation only in a modified search range, unnecessary computation may be reduced and an occlusion region can be processed. Furthermore, since a median value of three estimated motion vectors may be selected, a wrong MV may be corrected and a true motion vector may be obtained, thereby implementing a high-precision video.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A frame interpolation apparatus that interpolates a plurality of frames including an $n^{th}$ frame and an $(n-1)^{th}$ frame located adjacent to the $n^{th}$ frame to generate an interpolation frame, the frame interpolation apparatus comprising:

a static object separation unit that is configured to compare an $n^{th}$ frame macroblock (MB) of a plurality of $n^{th}$ frame MBs with an $(n-1)^{th}$ frame MB of a plurality of $(n-1)^{th}$ frame MBs to separate the $n^{th}$ frame MB into a static object and a moving object;

a motion vector (MV) estimation unit that is configured to search the $(n-1)^{th}$ frame for an MB that matches the $n^{th}$ frame MB that is determined to be the moving object to estimate-MVs; and an interpolation frame generation unit that is configured to generate the interpolation frame using the estimated MVs, the $n^{th}$ frame, and the $(n-1)^{th}$ frame, wherein the motion vector estimation unit searches in at least three search ranges of the (n−1)th frame and estimates at least three estimated MVs, and the interpolation frame generation unit selects a median value of the at least three estimated MVs for generating the interpolation frame and wherein the at least three search ranges includes a first search range, a second search range and a third search range, and the first search range includes the $(n-1)^{th}$ frame MB that corresponds to the matching $n^{th}$ frame MB and the $(n-1)^{th}$ frame MBs that are adjacent the corresponding $(n-1)^{th}$ frame MB and the second search range includes the $(n-1)^{th}$ frame MB that corresponds to the matching $n^{th}$ frame MB and $(n-1)^{th}$ frame MBs that are adjacent the corresponding $(n-1)^{th}$ frame MB and that corresponds to the $n^{th}$ frame MBs determined to be moving objects, wherein the MV estimation unit comprises:

a search range processing unit that is configured to search in a first search range of the $(n-1)^{th}$ frame for the MB that matches with the $n^{th}$ frame MB to estimate a first MV;

a modified search range processing unit that is configured to search in a second search range of the $(n-1)^{th}$ frame for the MB that matches with the $n^{th}$ frame MB to estimate a second MV; and a current MB processing unit that is configured to match $n^{th}$ frame MB with an $(n-1)^{th}$ frame MB of the plurality of $(n-1)^{th}$ frame MBs, which corresponds to the $n^{th}$ frame MB to estimate a third MV, wherein the first search range includes MBs of the $(n-1)^{th}$ frame and the second search range includes the $(n-1)^{th}$ frame MBs that correspond to $n^{th}$ frame MBs that are determined to be the moving object, and wherein the modified search range processing unit is configured to calculate a sum of absolute differences (SAD)

for matching MBs and to estimate the second MV between an $(n-1)^{th}$ frame MB that has a minimum SAD, and the $n^{th}$ frame MB.

2. The frame interpolation apparatus of claim 1, wherein the search range processing unit is configured to calculate a sum of absolute differences (SAD) for matching MBs and to estimate the first MV between an $(n-1)^{th}$ frame MB that has a minimum SAD and the $n^{th}$ frame MB.

3. The frame interpolation apparatus of claim 1, wherein the current MB processing unit is configured to calculate a sum of absolute differences (SAD) for matching MBs to estimate the third MV.

4. The frame interpolation apparatus of claim 1, wherein the interpolation frame generation unit is configured to generate the interpolation frame using a median value of the estimated first MV, the estimated second MV, and the estimated third MV.

5. The frame interpolation apparatus of claim 1, wherein the interpolation frame generation unit is configured to generate the interpolation frame using a median value of the $n^{th}$ frame MB and the $(n-1)^{th}$ frame MB when a matching MB that matches with the $n^{th}$ frame MB of exists in the $(n-1)^{th}$ frame.

6. The frame interpolation apparatus of claim 1, wherein the interpolation frame generation unit is configured to generate the interpolation frame using the $n^{th}$ frame MB or the $(n-1)^{th}$ frame MB according to a direction of the estimated MVs when a matching MB that matches with the $n^{th}$ frame MB does not exist in the $(n-1)^{th}$ frame.

7. The frame interpolation apparatus of claim 6, wherein the interpolation frame generation unit uses the $n^{th}$ frame MB when a direction of the estimated MVs is from left to right and uses the $(n-1)^{th}$ frame MB when a direction of the estimated MVs is from right to left.

8. The frame interpolation apparatus of claim 1, wherein the static object separation unit is configured to calculate a difference between luminance signals of the $n^{th}$ frame MB and a corresponding $(n-1)^{th}$ frame MB, compare the difference with a threshold that is a criterion for distinguishing the moving object from the static object, and separate each of the plurality of $n^{th}$ frame MBs into the static object and the moving object.

9. The frame interpolation apparatus of claim 8, wherein the static object separation unit is configured to determine the $n^{th}$ frame MB as the moving object when the difference is greater than the threshold and to determine the $n^{th}$ frame MB as the static object when the difference is less than the threshold.

10. A frame interpolation method that interpolates a plurality of frames including an $n^{th}$ frame and an $(n-1)^{th}$ frame that is located adjacent the $n^{th}$ frame to generate an interpolation frame, the frame interpolation method comprising:

comparing an $n^{th}$ frame macroblock (MB) with an $(n-1)^{th}$ frame MB that corresponds to the $n^{th}$ frame MB to separate each of a plurality of $n^{th}$ frame MBs into a static object and a moving object;

searching in the $(n-1)^{th}$ frame for an MB that matches each of the plurality of $n^{th}$ frame MBs that are determined to be the moving object;

estimating motion vectors (MVs) responsive to the MB that matches each of the plurality of $n^{th}$ frame MBs that are determined to be the moving object; and generating the interpolation frame using estimated MVs, the $n^{th}$ frame, and the $(n-1)^{th}$ frame, wherein estimating the MVs includes searching in at least three search ranges of the (n-1)th frame and estimating at least three estimated MVs, wherein generating the interpolation frame includes selecting a median value of the at least three estimated MVs, wherein the at least three search ranges includes a first search range, a second search range and a third search range, and the first search range includes the $(n-1)^{th}$ frame MB that corresponds to the matching $n^{th}$ frame MB and the $(n-1)^{th}$ frame MBs that are adjacent the corresponding $(n-1)^{th}$ frame MB and the second search range includes the $(n-1)^{th}$ frame MB that corresponds to the matching $n^{th}$ frame MB and $(n-1)^{th}$ frame MBs that are adjacent the corresponding $(n-1)^{th}$ frame MB and that corresponds to the $n^{th}$ frame MBs determined to be moving objects, wherein estimating the MVs comprises:

searching in a first search range of the $(n-1)^{th}$ frame for an MB that matches each of the plurality of $n^{th}$ frame MBs to estimate a first MV;

searching in a second search range of the $(n-1)^{th}$ frame for an MB that matches each of the plurality of the $n^{th}$ frame MBs to estimate a second MV; and matching an $n^{th}$ frame MB with an $(n-1)^{th}$ frame MB that corresponds to the $n^{th}$ frame MB to estimate a third MV, wherein the first search range includes the $(n-1)^{th}$ frame MBs and the second search range includes the $(n-1)^{th}$ frame MBs that correspond to the $n^{th}$ frame MBs that are determined to be the moving object, and wherein estimation of the second MV comprises:

calculating a sum of absolute differences (SAD) for matching MBs; and estimating the second MV between an $(n-1)^{th}$ frame MB that has the minimum SAD and the $n^{th}$ frame MB.

11. The frame interpolation method of claim 10, wherein the first search range includes the $(n-1)^{th}$ frame MB that corresponds to the matching $n^{th}$ frame MB and the plurality of the $(n-1)^{th}$ frame MBs that are located adjacent to the corresponding $(n-1)^{th}$ frame MB.

12. The frame interpolation method of claim 10, wherein the second search range includes the $(n-1)^{th}$ frame MB that corresponds to a matching $n^{th}$ frame MB and the plurality of $(n-1)^{th}$ frame MBs that are adjacent the corresponding $(n-1)^{th}$ frame MB and correspond to the plurality of $n^{th}$ frame MBs that are determined to be the moving object.

13. The frame interpolation method of claim 10, wherein estimation of the first MV comprises:

calculating a sum of absolute differences (SAD) for matching MBs; and estimating the first MV between an $(n-1)^{th}$ frame MB that has a minimum SAD and the $n^{th}$ frame MB.

14. The frame interpolation method of claim 10, wherein estimation of the third MV comprises calculating a sum of absolute differences (SAD) for matching MBs to estimate the third MV.

15. The frame interpolation method of claim 10, wherein generating the interpolation frame comprises:

selecting a median value of the estimated first MV, the estimated second MV, and the estimated third MV; and generating the interpolation frame using the selected median value.

16. The frame interpolation method of claim 10, wherein generating the interpolation frame comprises:

determining whether an MB that matches the $n^{th}$ frame MB exists in the $(n-1)^{th}$ frame;

generating the interpolation frame using a median value of the $n^{th}$ frame MB and the $(n-1)^{th}$ frame MB when an MB that matches the $n^{th}$ frame MB exists in the $(n-1)^{th}$ frame; and generating the interpolation frame using the $n^{th}$ frame MB or the $(n-1)^{th}$ frame MB according to a direction of the estimated MVs when an MB that matches the $n^{th}$ frame MB does not exist in the $(n-1)^{th}$ frame.

17. The frame interpolation method of claim 16, wherein generating the interpolation frame according to the direction of the estimated MVs comprises:
   determining the direction of the estimated MVs;
   generating the interpolation frame using the $n^{th}$ frame MB when the direction of the estimated MVs is from left to right; and
   generating the interpolation frame using the $(n-1)^{th}$ frame MB when the direction of the estimated MVs is from right to left.

18. The frame interpolation method of claim 10, wherein comparing an $n^{th}$ frame macroblock (MB) with an $(n-1)^{th}$ frame MB that corresponds to the $n^{th}$ frame MB to separate each of a plurality of $n^{th}$ frame MBs into a static object and a moving object comprises:
   calculating a difference between luminance signals of the $n^{th}$ frame MB and the corresponding $(n-1)^{th}$ frame MB;
   comparing the difference with a threshold that is a criterion for distinguishing the moving object from the static object; and
   separating each of the plurality of $n^{th}$ frame MBs into the static object and the moving object.

19. The frame interpolation method of claim 18, wherein separating each of the plurality of $n^{th}$ frame MBs comprises:
   determining the $n^{th}$ frame MB as the moving object when the difference is greater than the threshold; and
   determining the $n^{th}$ frame MB as the static object when the difference is less than the threshold.

\* \* \* \* \*